Feb. 11, 1969  J. W. WILKINSON ET AL  3,426,900
DISPOSABLE TYPE FILTER
Filed Sept. 13, 1966
Sheet 1 of 3
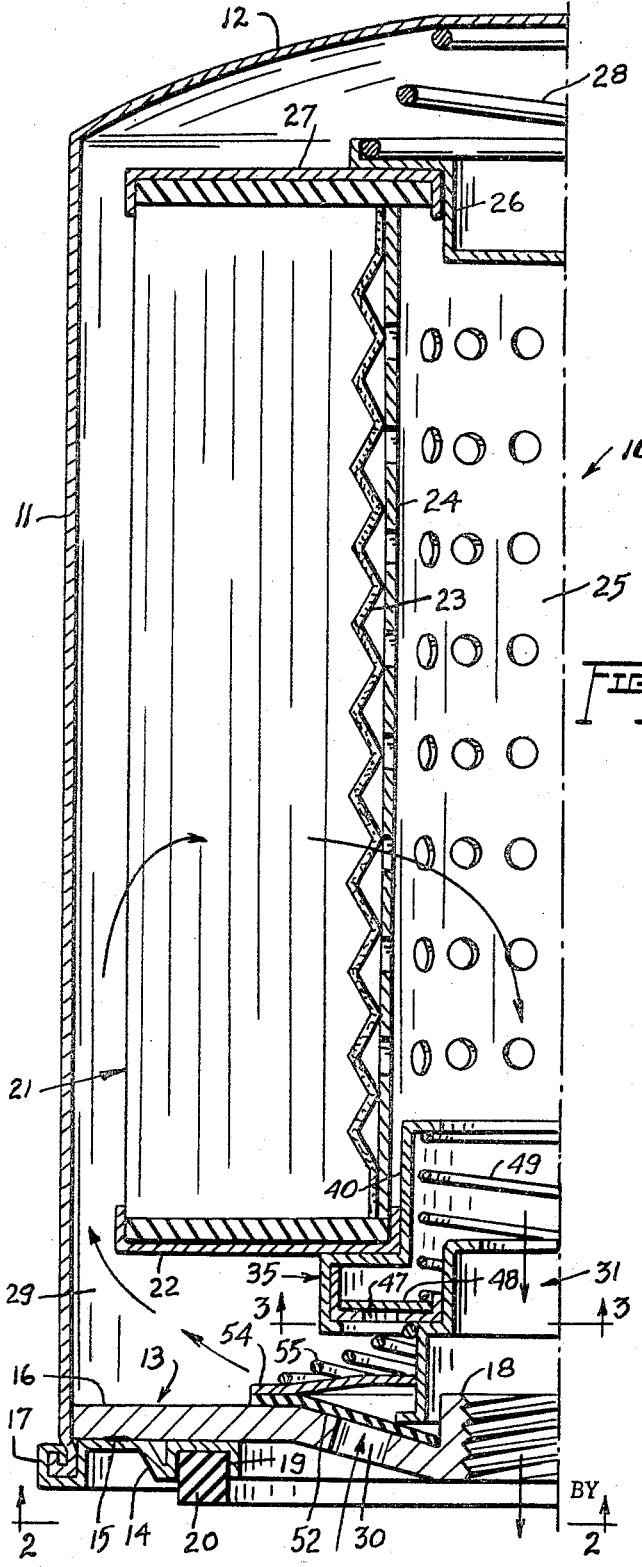
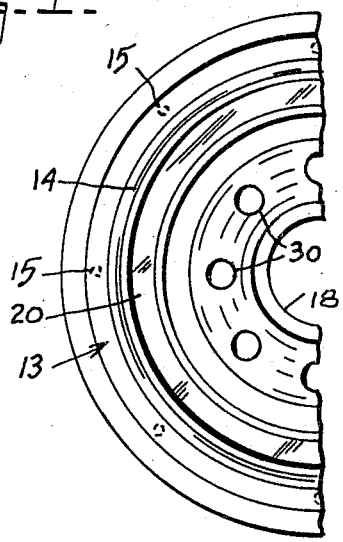
INVENTORS
James W. Wilkinson
Robert J. Shaltis
BY Munson H. Lane
ATTORNEY

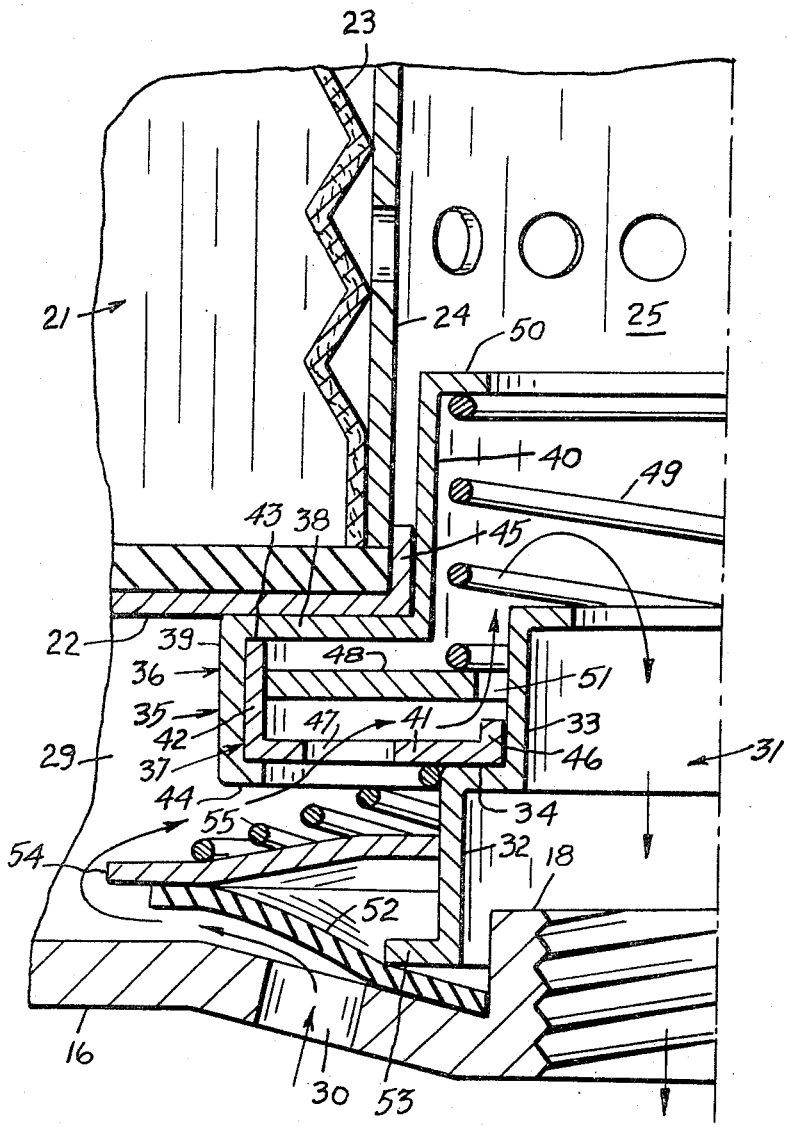

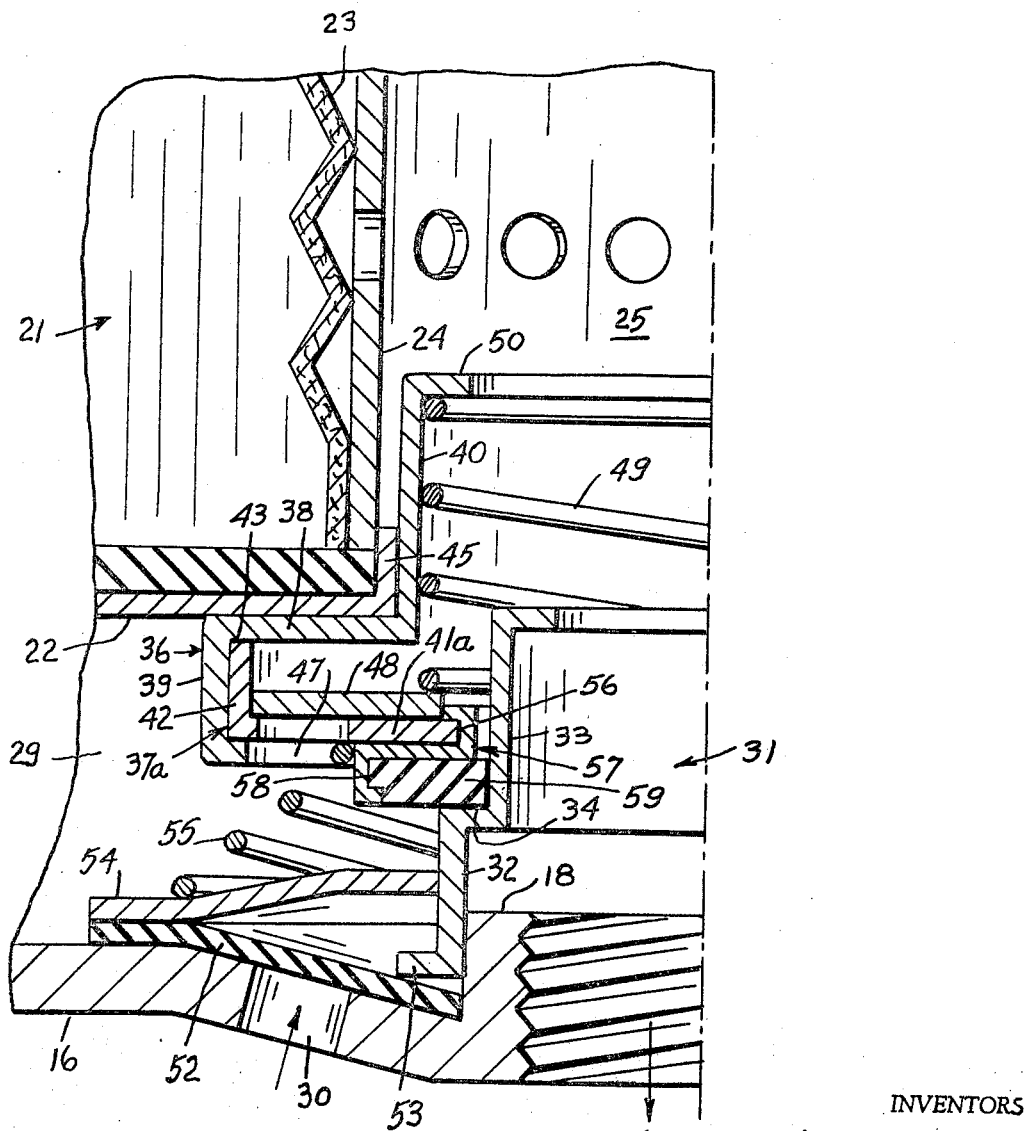

United States Patent Office
3,426,900
Patented Feb. 11, 1969

3,426,900
DISPOSABLE TYPE FILTER
James W. Wilkinson and Robert J. Shaltis, Hastings, Mich., assignors to Hastings Manufacturing Company, Hastings, Mich., a corporation of Michigan
Filed Sept. 13, 1966, Ser. No. 579,145
U.S. Cl. 210—130                              14 Claims
Int. Cl. B01d 27/10

ABSTRACT OF THE DISCLOSURE

This application discloses a disposable type filter including a filter housing having a base provided with a central outlet neck and with inlet passages spaced radially from said neck, a filter cartridge provided in said housing in spaced relation from said base plate, said cartridge having a central outlet chamber and said housing defining an inlet chamber around the cartridge and between the cartridge and said base plate. In accordance with the invention a stepped adapter is provided having an enlarged base portion and a reduced upper portion with an intermediate upwardly facing shoulder portion on which is supported a relief valve casing. The upper portion of a flexible anti-drainback valve is adapted to be interposed between the foot or base of the adapter and the base plate while an annular sealing disc is mounted about the enlarged lower portion of the adapter and is spring biased against the outer portion of the anti-drain valve to normally hold the same in closed position. The adapter permits the use of a conventional housing and a conventional filter and provides a compact arrangement for the valve elements used in connection therewith.

---

This invention relates to new and useful improvements in filters, particularly oil filters of internal combustion engines, and the principal object of the invention is to provide a disposable type filter embodying a novel construction of two separate valve means, namely, anti-drainback valve means which prevents drainage of oil from the filter to the engine when the latter is stopped, and pressure relief valve means which permits the filter cartridge to be by-passed when the cartridge is dirty or the oil is excessively viscous under cold operating conditions.

As such, the disposable filter of the invention comprises a spin-on shell or housing which is sealed or lock-seamed to its base plate, the housing containing a filter cartridge in spaced relation from the base plate, and the two aforementioned separate valve means are conveniently accommodated in the space between the base plate and the cartridge on a special adapter which facilitates economical manufacture and expeditious assembly of the various components into a sealed disposable unit.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a fragmentary vertical sectional view showing the filter of the invention;

FIGURE 2 is a fragmentary bottom plan view on a reduced scale, taken from the plane of the line 2—2 in FIG. 1;

FIGURE 3 is a fragmentary cross-sectional view on a reduced scale, taken substantially in the plane of the line 3—3 in FIG. 1;

FIGURE 4 is an enlarged, fragmentary detail showing the lower portion of FIG. 1 but with the valves open; and FIGURE 5 is a fragmentary detail, similar to that shown in FIG. 4 but illustrating a modified embodiment of the invention with the valves thereof in the closed position.

Referring now to the accompanying drawings in detail, more particularly to FIGS. 1–3 inclusive, the disposable type filter of the invention is designated generally by the numeral 10. The same is of a cylindrical form, and since its construction is symmetrical with respect to its longitudinal axis, only a portion thereof on one side of that axis has been illustrated.

The filter 10 comprises a spin-on shell or housing 11 formed integrally with a closed, dome-shaped upper end 12, while the lower end of the housing is closed by a base plate assembly 13 which includes an annular base plate member 14 of relatively thin material secured, as by spot welding 15, or the like, to the underside of a relatively thick, reinforcing base plate member 16. The lower end of the housing 11 is lock-seamed and sealed as at 17 to the base plate member 14 and hence to the base plate 13 itself, as will be clearly apparent.

The base plate member 16 is provided with an upwardly or inwardly projecting, internally screw-threaded, centrally disposed outlet neck 18, by which the entire filter is connected to a pipe fitting (not shown) of the engine lubricating system. The base plate member 14 is shaped to provide a downwardly opening annular groove 19 having an annular gasket 20 seated therein, this gasket being adapted to sealingly engage the engine when the neck 18 of the filter is screwed down in the aforementioned pipe fitting in the well known manner. However, it is to be noted that the gasket 20 is held in the groove 19 more-or-less loosely, or only by friction, so that when the filter is being removed from the engine, the gasket may separate either from the engine or from the groove 19 to facilitate the filter removal.

A filter cartridge 21 of suitable construction is positioned in the housing 11 with the lower end wall 22 of the cartridge being spaced upwardly from the base plate 13. The cartridge may be either a depth pack utilizing cotton linters or a mixture of woodwool, sisal and threadwaste as the filtering medium, or it may use pleated paper filtering media, as indicated at 23. In any event, the filtering medium surrounds a central perforated tube 24 which defines a central outlet chamber 25 within the cartridge, the upper end of this chamber being closed by a cap 26 which is press-fitted into the top wall 27 of the cartridge, as shown. The cap 26 also provides a seat for a relatively strong compression spring 28 which bears against the upper end 12 of the housing 11 and thus urges the cartridge downwardly in the housing.

The housing 11 defines around the outside of the cartridge and in the space between the lower end of the cartridge and the base plate 13 an inlet chamber 29, communicated by a plurality of inlet passages 30 formed in the base plate member 16 in radially spaced relation from the outlet neck 18. Thus, oil flowing through the passages 30 into the inlet chamber 29 enters the filtering medium of the cartridge 21 from the outside and then passes through the perforated tube 24 into the outlet chamber 25 at the inside of the cartridge, as indicated by arrows in FIG. 1.

The invention concerns itself primarily with anti-drainback valve means for preventing drainage of oil from the inlet chamber 29 to the engine when the engine is stopped, and with pressure relief valve means for permitting by-passing of the filter cartridge 21 when the cartridge is dirty or when the oil is excessively viscous under cold operating conditions. The pressure relief valve means is so arranged that the oil by-passing the cartridge is returned directly to the engine without scrubbing against the cartridge or against an accumulation of dirt on the base plate of the filter, so that the dirt is not recirculated through the lubricating system.

The structural arrrangement of the anti-drainback valve means and of the pressure relief valve means, although shown in FIG. 1, is more clearly illustrated in the enlarged view of FIG. 4, so reference is now drawn particularly to that figure. A tubular adapter 31 is positioned in the space between the base plate 13 and the bottom 22 of the cartridge 21, the adapter 31 being diametrically stepped intermediate the ends thereof so as to provide a relatively large base portion 32 and a reduced upper portion 33 with an upwardly facing annular shoulder 34 therebetween, it being noted that the adapter is coaxial with the outlet neck 18 and that the base portion of the adapter surrounds the neck, in radially outwardly spaced relation therefrom, if so desired.

The pressure relief valve assembly comprises an annular casing 35 which is mounted on the upper portion 33 of the adapter 31, the casing 35 preferably consisting of interfitted outer and inner casing members 36, 37, respectively. The outer casing member 36 includes a top wall 38 which is provided at its outer marginal edge with a depending annular side wall 39, while the inner marginal edge of the top wall is formed with an upward tubular extension 40, hereinafter to be further described. The inner casing member 37 includes a bottom wall 41 provided at its outer marginal edge with an upstanding annular side wall 42, the upper edge of the side wall 42 abutting the top wall 38 of the member 36 so as to retain the bottom wall 41 in downwardly spaced relation from the top wall 38. The lower edge portion of the side wall 39 is inturned to provide a lip 44 below the bottom wall 41, thus holding the inner casing member 37 assembled within the outer casing member 36, as will be readily apparent.

The aforementioned tubular extension 40 of the casing member 36 is press-fitted into the lower end portion of the outlet chamber 25 of the cartridge 21, such press-fitting existing either between the extension 40 and an upturned rim 45 of the cartridge bottom wall 22, or directly between the extension 40 and the inside of the tube 24 where the particular construction of the cartridge does not provide the rim 45. In either event, by virtue of the press-fitting, the entire casing is held firmly assembled to the cartridge. Moreover, the bottom wall 41 of the casing member 37 has an upturned inner lip 46 which is press-fitted on the upper portion 33 of the adapter 31, while the lower face of the bottom wall 41 is seated on the upwardly facing annular shoulder 34. It will be apparent from the foregoing that the press-fit of the casing 35 in the cartridge 21 and on the adapter 31 rigidly secures these components together, and that the downward biasing action of the spring 28 on the cartridge thus urges the adapter 31 downwardly toward the base plate member 16. It will be also apparent that the casing 35 isolates the inlet chamber 29 outside the cartridge from the outlet chamber 25 inside the cartridge, but the bottom wall 41 of the casing is provided with a plurality of openings, apertures or valve ports 47 whereby oil in the inlet chamber 29 may flow through the casing 35 and through the adapter 31 to the outlet neck 18 in by-pass of the filter cartridge 21. The pressure relief valve assembly also includes a sealing disc 48 which is movably positioned in the casing 35 between the bottom wall 41 and the top wall 38 in overlying relation to the apertures 47, but is normally pressed against the bottom wall 38 by a compression spring 49, so as to close the apertures 47 and thus cause the oil in the inlet chamber 29 to travel through the filtering medium of the cartridge into the outlet chamber 25 before reaching the outlet neck 18. The spring 49 is interposed between the sealing disc 48 and an inturned lip 50 provided at the upper end of the casing extension 40, as illllustrated.

It is to be particularly noted that the entire pressure relief valve is disposed exteriorly of the cartridge 21, only with exception of the extension 40 which projects into the cartridge in order to accommodate the spring 49 and to afford a press-fit between the casing 35 and the cartridge chamber 25. As a result of this disposition of the pressure relief valve exteriorly of the cartridge, the oil in the inlet chamber 29 may be by-passed directly through the valve casing 35 into the adapter 31 and hence to the outlet neck 18, without coming in contact with the filtering medium of the cartridge or with dirt sediment in the lower end portion of the filter.

It will be also noted that the inside diameter of the sealing disc 48 is larger than the outside diameter of the adapter portion 33. This not only serves to accommodate the lip 46 on the bottom wall 41, but what is more important, it provides an annular space 51 when the disc is raised from the bottom wall, such space facilitating the flow of by-passed oil through the casing 35 into the adapter 31, as indicated by the arrows in FIG. 4.

The anti-drainback valve means which prevents draining of oil from the inlet chamber 29 to the engine when the latter is stopped comprises an annular valve member 52 of flexible material such as silicon rubber, or the like, which is superposed on the base plate member 16 in overlying relation to the inlet passages 30 and in surrounding relation to the outlet neck 18. The lower end of the base portion 32 of the adapter 31 is provided with an outturned flange 53 which, under the action of the spring 28 biasing the cartridge 21 downwardly, presses the inner marginal edge portion of the valve member 52 against the base plate member 16, but the outer marginal portion of the valve member is permitted to lift off the base plate member 16 under pressure of oil flowing through the passages 30 into the inlet chamber 29. However, suitable means are provided for normally holding the anti-drain valve means in closed position including annular spring biased means movably mounted on the enlarged base portion of the adapter 31. As shown a sealing disc 54 is slidably positioned on the adapter base portion 32 and has its outer marginal edge portion in engagement with the outer marginal edge portion of the valve member 52, the sealing disc 54 being biased downwardly by a compression spring 55 so as to urge the valve member 52 against the base plate 16 and close the passages 30 to prevent drainage of oil from the inlet chamber 29 to the engine when the latter is stopped and no oil pressure exists to overcome the resiliency of the spring 55. As will be noted, the spring 55 is interposed between the sealing disc 54 and the bottom wall 41 of the casing 35.

In normal operation, oil under pressure enters the passages 30, thus raising the valve member 52 against the resiliency of the spring 55 so that the oil may enter the inlet chamber 29 as shown in the lower portion of FIG. 4. After entering the chamber 29, the oil normally flows to the outside of the cartridge 21 and inwardly through the filtering medium of the cartridge into the outlet chamber 25 as indicated by arrows in FIG. 1, and thence through the adapter 31 and through the outlet neck 18.

As already noted, when the engine is stopped and no oil pressure exists, the spring 55 returns the valve member 52 to the base plate 16, thus closing the passages 30 and preventing drainback of oil to the engine.

If under cold operating conditions the oil in the inlet chamber 29 is too viscous for effective flow through the filtering medium of the cartridge 21, or if the filtering medium is so dirty that oil cannot properly flow therethrough, the build up of oil pressure in the inlet chamber 29 will raise the sealing disc 48 against the resiliency of the spring 49, thus uncovering the ports 47 and permitting the oil to flow through the casing 35 of the pressure relief valve directly into the adapter 31 and outlet neck 18, in complete by-pass of the filter cartridge, as indicated by arrows in FIG. 4.

FIG. 5 illustrates a somewhat modified embodiment of the invention which, for the most part, is the same as that already described and to that extent the same reference numerals are applicable. However, in the embodiment of FIG. 5 the bottom wall 41a of the inner casing member 37a is not press-fitted on the upper portion 33 of the adapter 31. Rather, the inner marginal edge of the wall 41a is spaced radially outwardly from the adapter portion 33 and is secured in an outwardly facing annular groove or channel 56 of a retainer ring 57 which is also spaced away from the adapter portion 33. The retainer ring 57 extends under the bottom wall 41a and is provided with an inwardly facing annular groove or channel 58 in which is secured an annular gasket 59 of rubber-like material. The inner marginal edge of the gasket 59 slidably and sealingly engages the adapter portion 33, while the lower face of the gasket abuts the upwardly facing shoulder 34.

As will be apparent, the gasket 59 affords a highly effective sealing action, since it is forced firmly against the adapter portion 33 as the inlet pressure increases. Moreover, since the gasket engages the adapter with a slidable contact, the filter cartridge 21 together with the entire pressure relief valve assembly may move upwardly in the housing 11 against the top spring 28, as for example by a road shock, and the sealing engagement of the gasket 59 with the adapter will still be effectively maintained.

While in the foregoing there have been described and shown the preferred embodiments of the invention, various modifications may bcome apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a disposable type filter, the combination of a housing including a base plate sealed to one end of the housing, said base plate being provided with a central outlet neck and with inlet passages spaced radially from said neck, a filter cartridge provided in said housing in spaced relation from said base plate, said cartridge having a central outlet chamber and said housing defining an inlet chamber around the cartridge and between the cartridge and said base plate, a tubular adapter positioned in the space between the base plate and the cartridge coaxially with said neck, said adapter being diametrically stepped intermediate the ends thereof to provide a relatively large cylindrical base portion and a reduced upper cylindrical portion with a flat upwardly facing annular shoulder therebetween, an annular pressure relief valve casing mounted on the upper portion of said adapter exteriorly of said cartridge and in seating engagement with the cartridge to isolate said inlet and outlet chambers from each other, pressure relief valve means provided in said casing for delivering fluid from said inlet chamber through said adapter to said neck in by-pass of said cartridge, and anti-drainback valve means provided between said casing and said base plate around the base portion of said adapter for closing said inlet passages, and being physically and operationally separate from said pressure relief valve means, and spaced substantially below the same, said annular relief valve casing being mounted on the upwardly facing shoulder of said adapter.

2. The device as defined in claim 1 wherein the anti-drainback valve means comprises a flexible annular valve member having its inner portion retained between the base portion of said adapter and the base plate of said housing.

3. The device as defined in claim 2 wherein the filter housing includes spring means reacting between the upper portion of said filter cartridge and the top of the housing, biasing the cartridge downwardly and forcing the base portion of said adapter against said flexible annular valve member to urge the same against the base plate of the filter housing.

4. The device as defined in claim 1 wherein an annular sealing disc for engagement with the anti-drainback valve is slidingly positioned about the base plate of the adapter.

5. The device as defined in claim 4 wherein a biasing spring is interposed between the lower face of said relief valve casing and said annular sealing disc.

6. In a disposable type filter, the combination of a housing including a base plate sealed to one end of the housing, said base plate being provided with a central outlet neck and with inlet passages spaced radially from said neck, a filter cartridge provided in said housing in spaced relation from said base plate, said cartridge having a central outlet chamber and said housing defining an inlet chamber around the cartridge and between the cartridge and said base plate, a tubular adapter positioned in the space between the base plate and the cartridge coaxially with said neck, said adapter being diametrically stepped intermediate the ends thereof to provide a relatively large base portion and a reduced upper portion with an upwardly facing annular shoulder therebetween, an annular pressure relief valve casing mounted on the upper portion of said adapter exteriorly of said cartridge and in seating engagement with the cartridge to isolate said inlet and outlet chambers from each other, pressure relief valve means provided in said casing for delivering fluid from said inlet chamber through said adapter to said neck in by-pass of said cartridge, and anti-drainback valve means provided between said casing and said base plate around the base portion of said adapter for closing said inlet passages, said anti-drainback valve means comprising a flexible annular valve member superposed on said base plate in overlying relation to said inlet passages, the inner marginal edge of said annular valve member surrounding said neck, the base portion of said adapter engaging the inner marginal edge portion of the valve member to retain the same in position while permitting the outer marginal edge portion of the valve member to lift off the base plate and uncover said inlet passages, a sealing disc slidably positioned on the base portion of said adapter and having its marginal edge portion in engagement with the outer marginal edge portion of said valve member, and a compression spring interposed between said casing and said sealing disc for urging the latter against said base plate.

7. The device as defined in claim 1 wherein said base portion of said adapter is press-fitted on said outlet neck.

8. The device as defined in claim 1 wherein said annular pressure relief valve casing is press-fitted on the upper portion of said adapter into abutment with said shoulder.

9. The device as defined in claim 1 wherein said annular pressure relief valve casing loosely encircles the upper portion of said adapter, together with an annular gasket carried by said casing, said gasket having its inner marginal edge in slidable sealing engagement with said upper portion of the adapter and also having a lower face seatable against said upwardly facing shoulder.

10. The device as defined in claim 9 together with a channelled retainer ring mounted on the inner marginal edge portion of said casing and supporting said gasket at the underside of the casing.

11. The device as defined in claim 1 wherein said annular pressure relief valve casing comprises an outer casing member having a top wall and an annular side wall, and an inner casing member having a bottom wall spaced downwardly from said top wall, said top wall being in abutment with the lower end of said cartridge and said bottom wall being provided with a plurality of openings, the space between said top and bottom walls of the casing communicating with the interior of said adapter, and said pressure relief valve means including a valve ring movably positioned in the space between said top and bottom walls in overlying relation to said openings, together with resilient means biasing said valve ring against said bottom wall.

12. The device as defined in claim 11 wherein said outer casing member also includes a tubular upward extension provided at the inner marginal edge of said top wall, said extension being press-fitted into the lower end of said outlet chamber of said cartridge.

13. The device as defined in claim 12 together with an inturned lip provided at the upper end of said extension, said resilient biasing means comprising a compression spring interposed between said valve ring and said lip.

14. In a disposable type filter, the combination of a housing including a base plate sealed to one end of the housing, said base plate being provided with a central outlet neck and with inlet passages spaced radially from said neck, a filter cartridge provided in said housing in spaced relation from said base plate, said cartridge having a central outlet chamber and said housing defining an inlet chamber around the cartridge and between the cartridge and said base plate, a tubular adapter positioned in the space between the base plate and the cartridge coaxially with said neck, said adapter being diametrically stepped intermediate the ends thereof to provide a relatively large base portion and a reduced upper portion with an upwardly facing annular shoulder therebetween, an annular pressure relief valve casing mounted on the upper portion of said adapter exteriorly of said cartridge and in seating engagement with the cartridge to isolate said inlet and outlet chambers from each other, pressure relief valve means provided in said casing for delivering fluid from said inlet chamber through said adapter to said neck in by-pass of said cartridge, and anti-drainback valve means provided between said casing and said base plate around the base portion of said adapter for closing said inlet passages, said annular pressure relief valve casing comprising an outer casing member having a top wall and an annular side wall, and an inner casing member having a bottom wall spaced downwardly from said top wall, said top wall being in abutment with the lower end of said cartridge and said bottom wall being provided with a plurality of openings, the space between said top and bottom walls of the casing communicating with the interior of said adapter, and said pressure relief valve means including a valve ring movably positioned in the space between said top and bottom walls in overlying relation to said openings, together with resilient means biasing said valve ring against said bottom wall, said inner casing member also including an annular side wall at the outer edge of said bottom wall, said last mentioned side wall being telescoped into the side wall of said outer casing member and having its upper edge in abutment with said top wall.

References Cited

UNITED STATES PATENTS 3,325,015   6/1937   Hathaway _____ 210—443

FOREIGN PATENTS 1,374,947   8/1964   France.

REUBEN FRIEDMAN, *Primary Examiner.*

THOMAS A. GRANGER, *Assistant Examiner.*

U.S. Cl. X.R.

210—440